United States Patent [19]

Dezawa et al.

[11] Patent Number: 4,581,251

[45] Date of Patent: Apr. 8, 1986

[54] PROCESS FOR PRODUCING COBALT-MODIFIED FERROMAGNETIC IRON OXIDE

[75] Inventors: Shin-ichiro Dezawa; Hideaki Kosha; Tatsuji Kitamoto, all of Kanagawa, Japan

[73] Assignee: Fuji Photo Film Co., Ltd., Kanagawa, Japan

[21] Appl. No.: 625,759

[22] Filed: Jun. 28, 1984

[30] Foreign Application Priority Data

Jun. 29, 1983 [JP] Japan ................................ 58-117770

[51] Int. Cl.$^4$ ........................ H01F 1/11; C01G 49/06
[52] U.S. Cl. ................................ 427/127; 252/62.56; 427/129
[58] Field of Search ............................. 427/127, 129; 252/62.56

[56] References Cited

U.S. PATENT DOCUMENTS 4,064,292 12/1977 Schoenafinger et al. ...... 427/127 X
4,212,903 7/1980 Schnell et al. ..................... 427/127

FOREIGN PATENT DOCUMENTS 58-103106 6/1983 Japan ................................ 252/62.56
58-161706 9/1983 Japan ................................ 252/62.56

Primary Examiner—Jack Cooper
Attorney, Agent, or Firm—Sughrue, Mion, Zinn, Macpeak and Seas

[57] ABSTRACT

A process for preparing cobalt-modified ferromagnetic iron oxide by modifying ferromagnetic $\gamma\text{-Fe}_2\text{O}_3$ particles with cobalt, wherein prior to cobalt modification treatment, the ferromagnetic $\gamma\text{-Fe}_2\text{O}_3$ is heat treated at a temperature in the range of from about $-200°$ C. to $+30°$ C. of the critical temperature at which partial transition of $\gamma\text{-Fe}_2\text{O}_3$ into $\alpha\text{-Fe}_2\text{O}_3$ occurs and which reduces the saturation magnetization to 99% of the saturation magnetization measured before the heat treatment, and the atomic ratio of $Fe^{++}/Fe^{+++}$ after the cobalt modification is 0.00 to 0.10.

5 Claims, 6 Drawing Figures

PROCESS FOR PRODUCING COBALT-MODIFIED FERROMAGNETIC IRON OXIDE

FIELD OF THE INVENTION

The present invention relates to a process for producing ferromagnetic iron oxide, and more particularly, to a process for producing ferromagnetic iron oxide for magnetic recording which has superior magnetic characteristics, reduced print-through tendency, and high saturation magnetization ($\sigma s$).

BACKGROUND OF THE INVENTION

Recently there has been a demand for magnetic recording media capable of high-density recording. A magnetic material that meets this demand should have high coercive force (Hc), high saturation magnetization ($\sigma s$), and low-noise performance. In order to fulfill these requirements, several methods have been proposed.

For instance, high coercive force (Hc) is achieved by increasing the length/diameter ratio of needle crystals of $\alpha$-FeOOH (which is a raw material of magnetic iron oxide) and calcining $\alpha$-FeOOH without breaking the needle shape of the crystals, or by incorporating magnetic iron oxide with cobalt.

Figure 1:
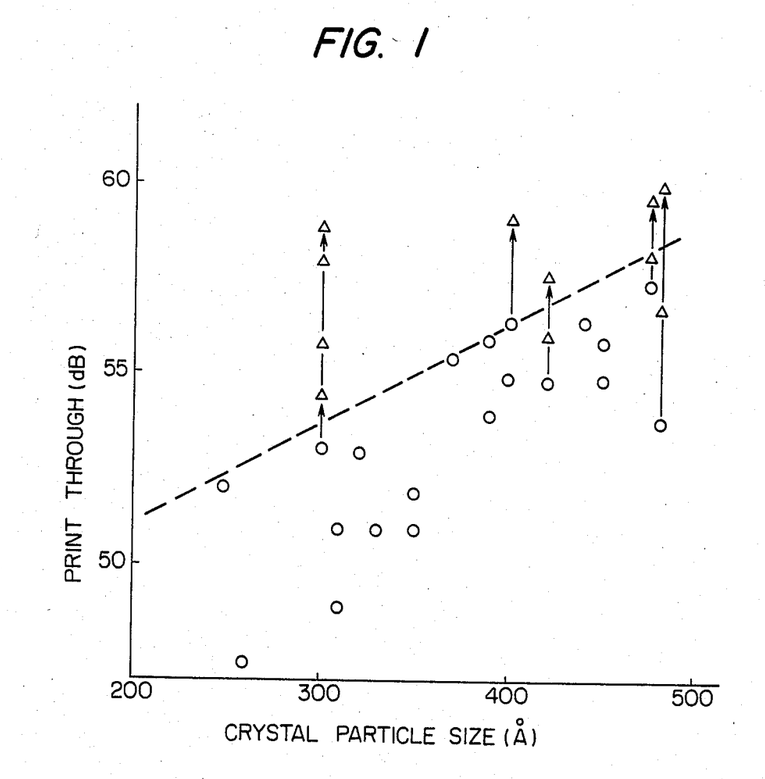
FIG. 1 is a graph showing the relationship between the particle size of $\gamma$-$Fe_2O_3$ crystals and the print-through property. The circles indicate the property of $\gamma$-$Fe_2O_3$ produced according to the conentional process; and the triangles indicate the property of $\gamma$-$Fe_2O_3$ produced according to the process of this invention.

The most effective way of reducing noise of a magnetic material itself is to make the particles of a magnetic material fine (i.e., small particle size). This method, however, has a disadvantage, in that, as the particles are made finer, the unit of magnetization becomes small and the magnetization becomes thermally unstable. Magnetic tape made of such a magnetic material is poor in print-through property (S/P). The relationship between the crystalline particle size and the print-through property is graphically shown in FIG. 1. According to the conventional technology, cobalt-modified iron oxide (marked with circles) becomes poor in print-through property (S/P) as the crystalline particle size is made finer, and it has been impossible to improve it beyond the limit indicated by the broken line. In addition, making the particles of a magnetic material finer has another disadvantage, viz., decreasing the saturation magentization ($\sigma s$).

There are several known processes for producing cobalt-modified ferromagnetic iron oxide.

According to a first category of processes, cobalt-modified ferromagnetic iron oxide is produced by causing iron oxide to form a solid solution with cobalt. Such processes are described in U.S. Pat. Nos. 3,117,933 and 3,671,435, Japanese Patent Publication Nos. 6538/19566, 4264/1974, 27719/1966 (counterpart of U.S. Pat. No. 3,573,980), 15759/1973, 10994/1973, and 6113/1967, and Japanese Patent Application (OPI) No. 101599/1973 (the term "OPI" as used herein refers to "published unexamined Japanese Patent Application"). The cobalt-containing iron oxide produced according to these processes, however, suffers from some disadvantages when applied to magnetic tape or magnetic recording media. That is, it is unstable to pressure and heat and the magnetic signals recorded thereon become weak with time and undergo considerable print-through.

According to a second category of processes, cobalt-modified ferromagnetic iron oxide is produced by coating or growing a cobalt compound layer or a cobalt-ferrite layer on the surface of magnetic iron oxide powder containing no cobalt (in the form of solid solution). Such processes are described in Japanese Patent Application (OPI) Nos. 108599/1974, 37667/1975, 37668/1975, 108599/1974, 37667/1975, 37668/1975, 82076/1975, 5497/1977, 5498/1977, and 129894/1978; Japanese Patent Publication No. 49475/1974; and West German Patent Application (OLS) No. 2,905,352. The magnetic iron oxide powder produced according to these processes is more stable to pressure and heat and improved in print-through property as compared with the powder produced according to the first category of processes. Nevertheless, it is impossible for these processes to provide a magnetic iron oxide powder which exhibits performance beyond the broken line in FIG. 1.

According to the conventional technology, $\gamma$-$Fe_2O_3$ which is modified with cobalt is usually produced by (1) dehydrating $\alpha$-FeOOH at 300° to 700° C. to provide $\alpha$-$Fe_2O_3$, (2) reducing the $\alpha$-$Fe_2O_3$ in a reducing gas at 300° to 400° C. to provide $Fe_3O_4$, and (3) oxidizing the $Fe_3O_4$ at a low temperature of from 200° to 300° C. The final oxidizing step is accomplished at a comparatively low temperature because it has been considered that $\gamma$-$Fe_2O_3$ is partly converted, irreversibly, into $\alpha$-$Fe_2O_3$, which is a non-magnetic stable material, when subjected to a high temperature. This leads to a decrease in magnetism.

SUMMARY OF THE INVENTION

In order to overcome the problems of the above-mentioned relationship between the print-through property and the particle size of magnetic material, the present inventors carried out extensive research, and have now discovered the finding that the print-through tendency can be greatly reduced in the case of cobalt-modified $\gamma$-$Fe_2O_3$ by heating $\gamma$-$Fe_2O_3$ beforehand and then modifying it with cobalt so that the atomic ratio of $Fe^{++}/Fe^{+++}$ in the resulting magnetic material becomes lower than 0.10.

Accordingly, it is an object of this invention to provide a process for producing ferromagnetic iron oxide, which process comprises heating $\gamma$-$Fe_2O_3$ at a temperature higher than the conventionally employed oxidizing temperature, and then coating or growing a cobalt ferrite layer on the surface of $\gamma$-$Fe_2O_3$ so that the atomic ratio of $Fe^{++}/Fe^{+++}$ in the resulting magnetic material becomes lower than 0.10.

More particularly, the present invention involves a process for preparing cobalt-modified ferromagnetic iron oxide by modifying ferromagnetic $\gamma$-$Fe_2O_3$ particles with cobalt, wherein prior to cobalt modification treatment, the ferromagnetgic $\gamma$-$Fe_2O_3$ is heat treated at a temperature in the range of from about −200° C. to +30° C. of the critical temperature at which partial transition of $\gamma$-$Fe_2O_3$ into $\alpha$-$Fe_2O_3$ occurs and which reduces the saturation magnetization value to 99% of the saturation magnetization value measured before the heat treatment, and the atomic ratio of $Fe^{++}/Fe^{+++}$ after the cobalt modification is 0.00 to 0.10.

DETAILED DESCRIPTION OF THE INVENTION

The heat treatment of γ-Fe$_2$O$_3$ is accomplished at a temperature in the range of about −200° C. to +30° C., preferably from −100° C. to 0° C., of the critical temperature (i.e., the temperature at which partial transition of γ-Fe$_2$O$_3$ into α-Fe$_2$O$_3$ occurs and the saturation magnetization (σs) becomes 99% of that measured prior to the heat treatment). If the heat treatment temperature is lower than that specified above, the desired effect is hardly produced; and in the reverse case, the resulting magnetic material does not decrease in print-through tendency any longer but greatly decreases in saturation magnetization (σs).

Figure 2:
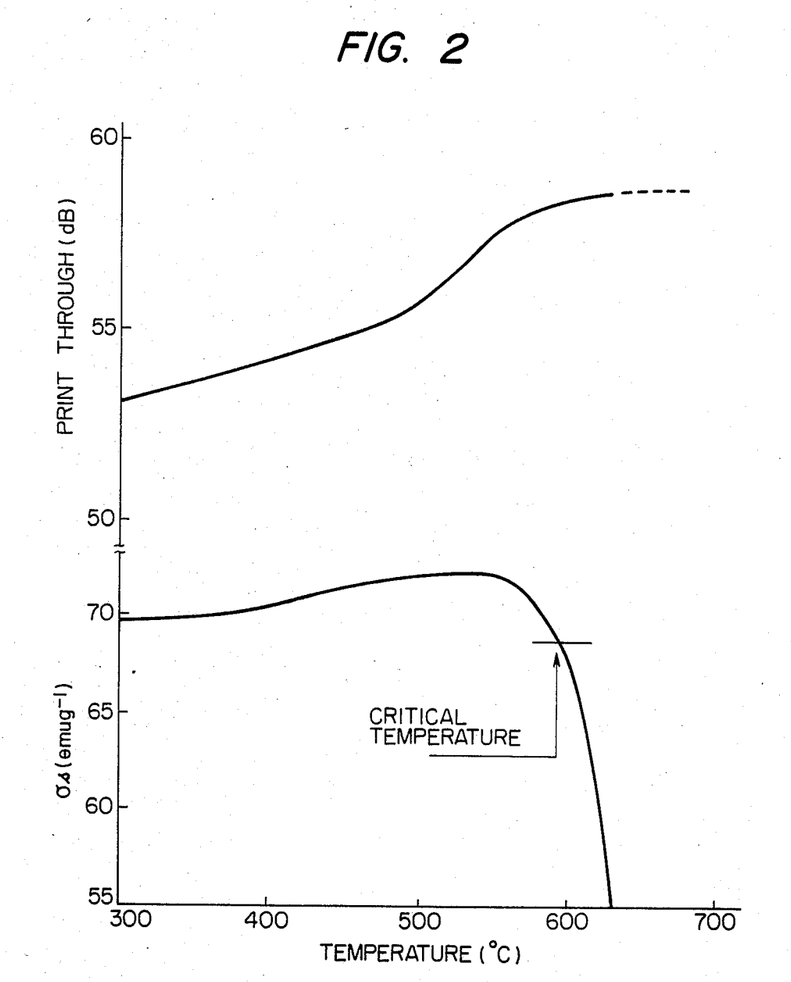
FIG. 2 shows graphical representation showing the relationship between the heat treatment temperature for γ-Fe$_2$O$_3$ and the saturation magnetization (σs) of the heat-treated γ-Fe$_2$O$_3$, and the relationship between the heat treatment temperature and the print-through property (S/P) of the cobalt-modified magnetic material.

FIG. 2 shows the relationship between the heat treatment temperature for γ-Fe$_2$O$_3$ and the saturation magnetization (σs) of the heat-treated γ-Fe$_2$O$_3$, and the relationship between the heat treatment temperature and print-through property (S/P) of the ferromagnetic iron oxide obtained by modifying the heat-treated γ-Fe$_2$O$_3$ with cobalt. The saturation magnetization (σs) increases as the temperature goes up. It reaches a peak at a temperature 50° C. to 100° C. lower than the critical temperature; and it begins to decline as the treatment temperature is raised further. At the critical temperature, the saturation magnetization (σs) is lower than that measured before the heat treatment. On the other hand, the print-through property is improved as the treatment temperature is raised; and it becomes conspicuous at a temperature about 100° C. lower than the critical temperature. It levels off at the critical temperature and beyond it.

The critical temperature is closely related to the temperature at which the transition of γ-Fe$_2$O$_3$ to α-Fe$_2$O$_3$ takes place. Since γ-Fe$_2$O$_3$ is a metastable substance, its transition temperature varies depending on its purity and the raw material and production method employed. Even the same γ-Fe$_2$O$_3$ undergoes transition at different temperatures depending on the heating rate and holding time. In the working of this invention, the critical temperature should be established according to the heating rate and holding time of the heat treatment and other conditions such as charge amount, the capacity of a container used, and the speed of rotation or agitation of the container. Heating rate is from 1° to 10° C./min., preferably from 2° to 5° C./min., and holding time is from 1 minute to 4 hours, preferably from 10 minutes to 1 hour. Moreover, the critical temperature is closely related to the temperature at which γ-Fe$_2$O$_3$ undergoes transition to α-Fe$_2$O$_3$. Since the transition from γ-Fe$_2$O$_3$ to α-Fe$_2$O$_3$ is an exothermic reaction, the critical temperature can be easily estimated by differential thermal analysis (DTA) or differential scanning calorimetry (DSC).

Various types of furnaces can be used for calcining iron oxide powders. For example, non-continuous type furnaces such as a tubular furnace, a box furnace, a flactar furnace, a crucible type electric furnace, a pit furnace and a hot air circulating incubator, continuous type furnaces such as a pusher furnace, a mesh conveyer furnace, an infra-heater drier, atmosphere furnaces such as a non-oxidative atmosphere furnace, a vacuum furnace and an ammonia decomposing apparatus. Ordinarily, a tubular furnace, e.g., one manufactured by Hayashi Electric Co., Ltd. or its variants are used. Those having an enlarged central portion are particularly preferred. Calcining tube introduced in the furnaces typically is of rotary kiln type.

Figure 3:
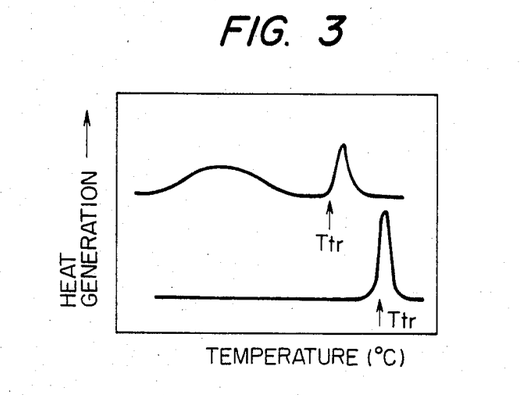
FIG. 3 is a schematic representation showing the relationship between the temperature and the heat value which was obtained when γ-Fe$_2$O$_3$ was subjected to differential thermal analysis (DTA).

As FIG. 3 shows, γ-Fe$_2$O$_3$ gives one or two exothermic peaks in DTA or DSC. The transition temperature measured by DAT (or DSC) is indicated by T$_{tr}$ in the figure. The critical temperature at which the transition from γ-Fe$_2$O$_3$ to α-Fe$_2$O$_3$ takes place in the ordinary kiln is 70° to 75° C. lower than the transition temperature T$_{tr}$ which is measured in DTA or DSC with a heating rate of 10° C./min.

The heat treatment of this invention can be applied to any γ-Fe$_2$O$_3$ to reduce the print-through tendency and to improve the saturation magnetization (σs). In other words, the heat treatment produces the effects regardless of the starting material (α-FeOOH or γ-FeOOH), method of calcination, specific surface area of γ-Fe$_2$O$_3$, pH, α-transition temperature, and the number of peaks in DTA. For example, γ-Fe$_2$O$_3$ described in U.S. Pat. Nos. 3,931,025, 3,272,595, 3,974,079, 3,904,540, etc. can be used in the present invention. The same effects as mentioned above can be produced by performing the oxidation of Fe$_3$O$_4$ into γ-Fe$_2$O$_3$ at the above-mentioned temperature range instead of performing the heat treatment for γ-Fe$_2$O$_3$. In this case, however, the transition temperature is obtained from γ-Fe$_2$O$_3$ which is obtained by oxidation at 250° C.

Figure 4:
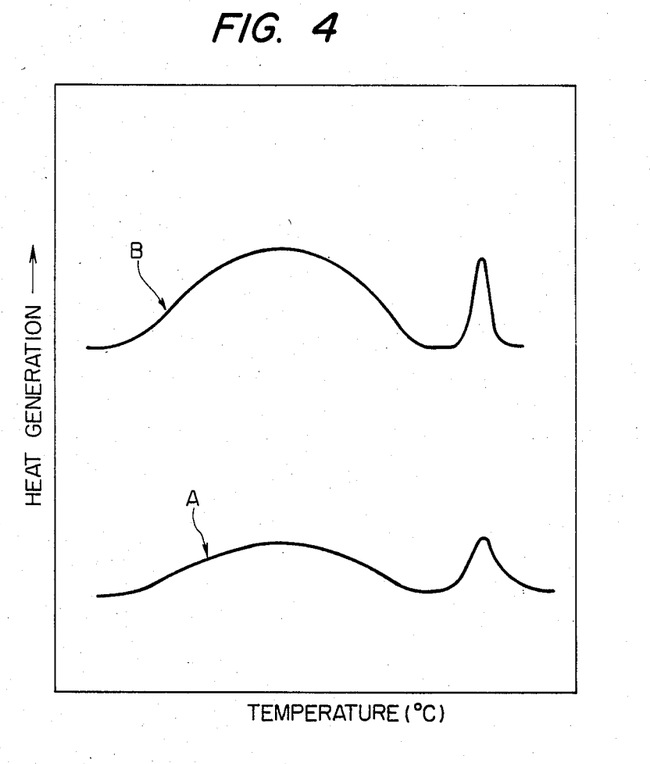
FIG. 4 is a schematic representation of DTA curve obtained before and after γ-Fe$_2$O$_3$ undergoes heat treatment according to the process of this invention. "A" is the DTA curve before heat treatment, and "B" is the DTA curve after heat treatment.

It is not fully elucidated yet why the magnetic characteristics are improved by the heat treatment as mentioned above. It is considered that the heat treatment makes the crystal structure more complete and increases the magnetic bonding strength, in view of the fact that the DTA curve of γ-Fe$_2$O$_3$ becomes sharp as a result of the heat treatment as shown in FIG. 4.

It is undesirable to perform the heat treatment of this invention on magnetic iron oxide which has been modified with cobalt, because the heat treatment will cause cobalt ions to diffuse into the particles, resulting in the so-called doping-type cobalt modification. Such cobalt modification causes the magnetic characteristics to greatly vary depending on temperature, aggravates the print-through tendency, and reduces the coercive force.

The cobalt modification accomplished by forming a solid solution is not preferable. The coercive force and magnetization of the resulting cobalt-modified magnetic iron oxide are unstable to pressure and heat.

The cobalt-modification should be achieved by coating or growing a cobalt compound layer or a cobalt ferrite layer on the surface of magnetic iron oxide powder. This method permits the heat treatment of $\gamma$-$Fe_2O_3$ to fully exhibit its effect. If $Fe^{++}$ is added to cobalt, the resulting magnetic material is improved in coercive force and saturation magnetization. On the other hand, as the quantity of $Fe^{++}$ is increased, the heat treatment of $\gamma$-$Fe_2O_3$ becomes less effective in reducing the print-through tendency.

Figure 5:
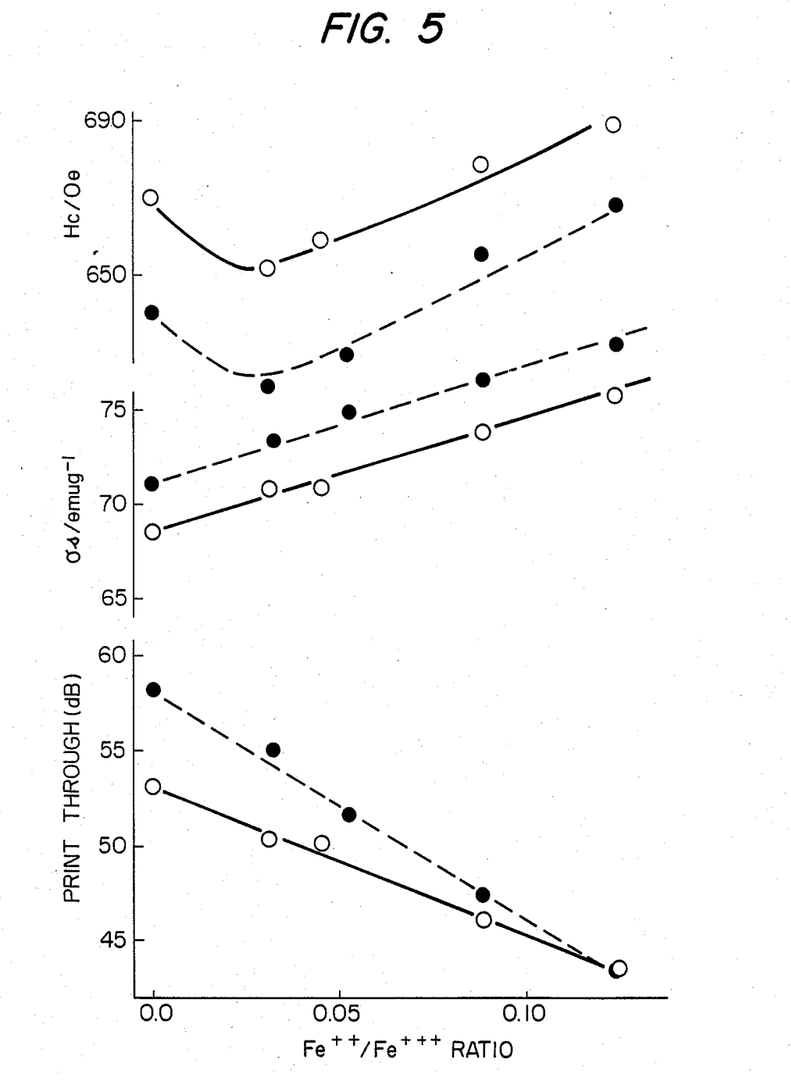
FIG. 5 is a graph showing how the Fe$^{++}$/Fe$^{+++}$ ratio after cobalt modification is related to Hc, σs, and print-through. The solid lines indicate the results in the case where the heat treatment of this invention was not carried out; and the broken lines indicate the results in the case where the heat treatment of this invention was carried out.

The coercive force of $\gamma$-$Fe_2O_3$ can be improved by adding cobalt or cobalt and $Fe^{++}$ to $\gamma$-$Fe_2O_3$ according to the methods shown in Table 1. Where methods B to D (shown in Table 1) are employed, the atomic ratio of $Fe^{++}/Fe^{+++}$ in the product should be lower than 0.10 so that the print-through tendency is reduced. FIG. 5 shows how the $Fe^{++}/Fe^{+++}$ ratio is related with the coercive force (Hc), saturation magnetization ($\sigma$s), and print-through tendency of the magnetic iron oxide produced according to method B in Table 1. The magnetic iron oxide having the $Fe^{++}/Fe^{+++}$ ratio=0 in FIG. 5 corresponds to the one obtained according to method A in Table 1.

TABLE 1

| | | Methods for Modification with Cobalt and Ferrous Ions | | |
|---|---|---|---|---|
| Method | Additive | Reaction Atmosphere | Outline of Method | Literature |
| A | $Co^{++}$ | Non-oxidative | A solution containing $Co^{++}$ is added to $\gamma$-$Fe_2O_3$ slurry. The slurry is heated, while being kept alkaline. The order of addition may be changed. | Japanese Patent Application(OPI) No. 74399/1984 and others |
| B | $Co^{++}$ & $Fe^{++}$ | Non-oxidative | A solution containing $Co^{++}$ and $Fe^{++}$ is added to $\gamma$-$Fe_2O_3$ slurry The slurry is heated, while being kept alkaline. | Japanese Patent Publication No. 36751/1977 and others |
| | | Oxidative | | Japanese Patent Publication No. 49475/1984 and others |
| C | $Co^{++}$, or $Co^{++}$ & $Fe^{++}$ | Non-oxidative or oxidative | The product obtained by method A, B, or C is heated in an inert gas. The product obtained by method A, B, or C is heated in a reducing or oxidizing atmosphere, so that the $Fe^{++}/Fe^{+++}$ ratio is changed. | Japanese Patent Application(OPI) No. 74399/1984 and others |

In FIG. 5, the solid lines indicate the results obtained with the conventional method (in which $\gamma$-$Fe_2O_3$ is cobalt-modified without a preliminary heat treatment), and the broken lines indicate the results obtained with the method of this invention (in which $\gamma$-$Fe_2O_3$ is cobalt-modified after preliminary heat treatment). It is noted that a great improvement in the reduction of print-through tendency is obtained in the latter case. However, the improvement becomes less significant as the $Fe^{++}/Fe^{+++}$ ratio increases, and virtually no improvement is made when it is greater than 0.10.

The invention is now described in more detail with reference to the following examples. The specific surface area of the powder was measured by means of the adsorption of nitrogen. pH was measured according to JIS method A. The transition temperataure was determined by DTA, with the heating rate of 10° C./min.

For the purpose of measuring the print-through of the magnetic powder produced according to the process of this invention, magnetic tape was prepared as follows. ("Parts" denotes "parts by weight".)

| Magnetic Materials | |
|---|---|
| Magnetic Powder | 100 parts |
| Vinyl Chloride-Vinyl Acetate Copolymer (VAGH, a product of Union Carbide Corp.) | 10 parts |
| Polyurethane (Nipporan 2301, a product of Nippon Polyurethane Co.) | 10 parts |
| Polyisocyanate (Colonate L, a product of Nippon Polyurethane Co.) | 3 parts |
| Soya lecithin | 1 part |
| Methyl Ethyl Ketone | 180 parts |
| Methyl Isobutyl Ketone | 120 parts |

The above-mentioned raw materials, excluding polyisocyanate, were mixed thoroughly by using a ball mill to make a dispersion, and then the polyisocynate was added to the dispersion. After filtration, the dispersion was applied to a smooth 15-$\mu$m thick PET backing, followed by orientation in the magnetic field and drying. The coated backing film underwent calendering and slitting into 3.8-mm widths.

The print-through property (S/P) was measured as follows: The 3.8-mm wide tape was wound on the reel of a compact cassette. After bulk erasure, 1 kHz signals were recorded at a prescribed input level (according to the standard MTS-102 of the Magnetic Tape Industry Association). The cassette was allowed to stand at 50° C. for 48 hours, and the output signals of playback were measured through a filter having the center frequency of 1 kHz and the band width of 6 dB per $\frac{1}{3}$ octave. Thus the signal level and the print-through level were compared.

The crystal particle size was determined by averaging the particle size calculated from the half-width of the face (220) of X-ray diffraction peak and the particle size calculated from the half-width of the face (440) of X-ray diffraction peak.

The magnetic characteristic properties were measured at an external magnetic field of 5 kOe by using a flux-meter USM-III made by Toei Kogyo Company.

EXAMPLE 1

Goethite formed in an alkaline solution was dehydrated at 600° C. in the air, followed by reduction at 320° C. in hydrogen, and oxidation at 250° C. in air, to provide γ-Fe$_2$O$_3$.

The transition temperature of this γ-Fe$_2$O$_3$ was 675° C. when measured by DTA at the heating rate of 10° C./min. 50 g of γ-Fe$_2$O$_3$ powder was placed in a 2-liter silica glass retort having one open end. The saturation magnetization (σs) of the powder was measured after it was kept at 500° C., 550° C., 600° C., and 620° C. for 10 minutes each. The saturation magnetization increased as the powder was heated up to 550° C. It decreased by 1 emu/g as compared with that measured before heat treatment. The heat treatment at 620° C. caused the saturation magnetization to decrease by 50% as compared with that measured before heat treatment. These results indicate that the critical temperature is 595° C. The γ-Fe$_2$O$_3$ was heated at 400° C., 500° C., 550° C., 600° C. and 615° C. for from 15 minutes to 4 hours (see Table 2 below).

Each batch (300 g) of the heat-treated γ-Fe$_2$O$_3$ was dispersed in 2 liters of water, and to the dispersion was added 31.6 g of cobalt sulfate (CoSO$_4$.7H$_2$O) dissolved in 1 liter of water. The dispersion was vigorously stirred for 10 minutes by blowing nitrogen at a rate of 0.5 liters/min. 489 g of NaOH dissolved in 1 liter of water was added. With continued stirring by blowing nitrogen gas, the dispersion was heated to 95° C. and kept at this temperature for 4 hours to carry out the reaction. The resulting magnetic materials were designated as samples 1-1, 1-2, 1-3, 1-4, 1-5, and 1-6.

On the other hand, the cobalt modification was carried out in the same way as mentioned above for γ-Fe$_2$O$_3$ which did not undergo heat treatment. The resulting magnetic material was designated as comparative sample 1. The characteristic properties of these magnetic materials are shown in Table 2.

Incidentally, the γ-Fe$_2$O$_3$ used as the raw material had Hc 392 Oe, σs 69.6 emu/g, pH 8.8, crystal particle size 300 Å, and specific surface area 30.4 m$^2$/g.

It is noted that as the heat treatment temperature is raised, the print-through property is improved, and the improvement levels off when the heat treatment temperature exceeds the critical point. On the other hand, σs increases as the heat treatment temperature exceeds 550° C.

TABLE 2

| Sample | Treatment Temp. (°C.) | Treatment Time (hr) | Hc (Oe) | SQ | σ s (emu/g) | Print-Through (dB) |
|---|---|---|---|---|---|---|
| 1-1 | 400 | 1 | 665 | 0.81 | 70.0 | 54.5 |
| 1-2 | 500 | 1 | 650 | 0.82 | 71.7 | 55.8 |
| 1-3 | 550 | ½ | 642 | 0.82 | 71.3 | 58.0 |
| 1-4 | 550 | 4 | 641 | 0.83 | 71.0 | 58.2 |
| 1-5 | 600 | 1 | 607 | 0.82 | 67.4 | 58.8 |
| 1-6 | 615 | 1 | 603 | 0.81 | 49.2 | 58.9 |
| Comparative Sample 1 | — | — | 670 | 0.80 | 68.5 | 53.1 |

EXMPLE 2

Goethite as used in Example 1 was converted into γ-Fe$_2$O$_3$ under the same conditions as in Example 1. The resulting γ-Fe$_2$O$_3$ underwent heat treatment at 590° C. for 1 hour. The heat-treated γ-Fe$_2$O$_3$ had Hc 406 Oe, σs 69.7 emu/g, specific surface area 30.5 m$^2$/g, and crystal particle size 310 Å.

This γ-Fe$_2$O$_3$ underwent cobalt modification in the same way as in Example 1. The resulting magnetic powder was designated as sample 2.

EXAMPLE 3

Goethite as used in Example 1 was dehydrated and reduced under the same conditions as in Example 1. The resulting product was oxidized at 550° C. to produce γ-Fe$_2$O$_3$.

The γ-Fe$_2$O$_3$ thus obtained had Hc 423 Oe, σs 73.2 emu/g, a pH of 8.8, and a crystal particle size of 320 Å.

This γ-Fe$_2$O$_3$ underwent cobalt modification in the same way as in Example 1. The resulting magnetic powder was designated as sample 3.

The characteristic properties of samples 2 and 3 and comprative sample 1 are shown in Table 3.

TABLE 3

| | Hc(Oe) | SQ | σ s (emu/g) | Print-Through (dB) |
|---|---|---|---|---|
| Sample 2 | 664 | 0.83 | 68.5 | 58.1 |
| Sample 3 | 659 | 0.82 | 68.9 | 56.7 |
| Comparative Sample 1 | 670 | 0.80 | 68.5 | 53.1 |

It is noted that the print-through property and σs are improved by either performing a heat treatment subsequent to the calcination of γ-Fe$_2$O$_3$ or raising the oxidation temperature.

EXAMPLE 4

γ-Fe$_2$O$_3$ was obtained from lepidocrosite. It had Hc 316 Oe, σs 74.7 emu/g, specific surface area 23.8 m$^2$/g, a crystal particle size of 400 Å, and a pH of 3.34. The transition temperature and critical temperature determined in the same way as in Example 1 were 484° C. and 410° C., respectively.

This γ-Fe$_2$O$_3$ and the ones which had been heat-treated at 410° C. and 380° C. for 1 hour were cobalt-modified in the same way as in Example 1. The resulting magnetic powders were designated as comparative sample 2, Sample 4-1, and sample 4-2, respectively. Their characteristic properties are shown in Table 4.

EXAMPLE 5

γ-Fe$_2$O$_3$ was obtained from lepidocrosite. It had Hc 315 Oe, σs 72.9 emu/g, specific surface area 26.7 m$^2$/g, a pH of 3.69, and a crystal particle size of 420 Å. The transition temperature and critical temperature obtained in the same way as in Example 1 were 486° C. and 400° C., respectively.

This γ-Fe$_2$O$_3$ and the others which had been heat-treated at 370° C. and 400° C. for 1 hour were cobalt-modified in the same way as in Example 1. The resulting magnetic powders were designated as comparative sample 3, sample 5-1, and sample 5-2, respectively. Their characteristic properties are shown in Table 4.

EXAMPLE 6

γ-Fe$_2$O$_3$ was obtained by calcination in the conventional method. It had a pH of 5.5, σs 73.9 emu/g, Hc 321 Oe, specific surface area of 24.9 m$^2$/g, and a crystal particle size of 480 Å. The α-transition temperature and critical temperature determined in the same way as in Example 1 were 642° C. and 575° C., respectively.

This γ-Fe$_2$O$_3$ and the ones which had been heat-treated at 570° C. and 530° C. for 1 hour were cobalt-modified in the same way as in Example 1. The resulting magnetic powders are designated as comparative sample 4, sample 6-1, and sample 6-2, respectively. Their characteristic properties are shown in Table 4.

It is noted from Table 4 that if $\gamma$-Fe$_2$O$_3$ undergoes heat-treatment, the print-through property of the cobalt-modified magnetic powder is greatly improved regardless of the properties of $\gamma$-Fe$_2$O$_3$ such as specific surface area, crystal particle size, pH, transition temperature, and critical temperature, and the crystal form of iron oxide hydrate and the conditions (acidic or alkaline) under which iron oxide hydrate is formed.

EXAMPLE 7

$\gamma$-Fe$_2$O$_3$ was obtained from goethite which had been formed in an acid solution. It had Hc 327 Oe, $\sigma$s 73.0 emu/g, specific surface area of 23.3 m$^2$/g, a pH of 3.8, and a crystal particle size of 490 Å. The transition temperature and critical temperature determined in the same way as in Example 1 were 643° C. and 565° C., respectively.

This $\gamma$-Fe$_2$O$_3$ and the ones which had been heat-treated at 560° C. and 510° C. for 1 hour were cobalt-modified in the same way as in Example 1. The resulting magnetic powders were designated as comparative sample 5, sample 7-1, and sample 7-2, respectively. Their characteristic properties are shown in Table 4.

TABLE 4

| Sample | Comparative Sample | Hc(Oe) | $\sigma$ s (emu/g) | Print-through (dB) |
|---|---|---|---|---|
| 4-1 | | 642 | 73.0 | 59.2 |
| 4-2 | | 635 | 73.8 | 59.0 |
| | 2 | 610 | 73.1 | 56.5 |
| 5-1 | | 598 | 69.0 | 57.7 |
| 5-2 | | 605 | 72.6 | 56.1 |
| | 3 | 602 | 72.0 | 54.9 |
| 6-1 | | 635 | 72.7 | 60.1 |
| 6-2 | | 642 | 73.3 | 57.0 |
| | 4 | 660 | 72.7 | 53.8 |
| 7-1 | | 633 | 69.2 | 59.8 |
| 7-2 | | 625 | 72.2 | 58.3 |
| | 5 | 630 | 71.5 | 57.5 |

EXAMPLE 8

The same $\gamma$-Fe$_2$O$_3$ as used in Example 1 and the one which had been annealed at 600° C. for 1 hour underwent coblt modification according to the following method.

300 g of $\gamma$-Fe$_2$O$_3$ was dispersed in an aqueous solution of 31.6 g of cobalt sulfate (CoSO$_4$.7H$_2$O) in 2 liters of water. With vigorous stirring, 176 g of NaOH dissolved in 1 liter of water was added. The dispersion was heated to 95° C. 15.5 g of ferric sulfate (Fe$_2$(SO$_4$)$_3$.7H$_2$O) dissolved in 1 liter of water was added over 1 hour at a rate of 16 ml per/min. Heating and stirring were continued for 3 hours to carry out reaction for 4 hours in total. The reation product was washed with water, dehydrated, and dried.

The resulting magnetic powders were designated as comparative sample 6 and sample 8. Their characteristic properties are shown in Table 5.

EXAMPLE 9

The same $\gamma$-Fe$_2$O$_3$ as used in Example 1 and the one which had been annealed at 600° C. for 1 hour underwent cobalt modification according to the following method.

300 g of $\gamma$-Fe$_2$O$_3$ was dispersed in 2 liters of water. With vigorous stirring by blowing nitrogen gas at a rate of 0.5 liter/min, an aqueous solution of 31.6 g of cobalt sulfate (CoSO$_4$.7H$_2$O) and 81 g of ferrous sulfate (FeSO$_4$.7H$_2$O) in 0.5 liter of water was added. 10 minutes later, 153 g of NaOH dissolved in 0.5 liter of water was added. The dispersion was kept to 95° C. for 4 hours. The reaction product was washed with water, dehydrated, and dried.

The resulting magnetic powders were designated as comparative sample 7 and sample 9. Their characteristic properties are shown in Table 5.

EXAMPLE 10

The magnetic materials prepared under the same conditions as in Example 9 underwent heat treatment in nitrogen at 150° C. for 2 hours.

The resulting magnetic powders were designated as comparative sample 8 and sample 10. Their characteristic properties as shown in Table 5.

EXAMPLE 11

The magnetic materials prepared under the same conditions as in Example 9 were kept at 100° C. in the air to oxidize Fe$^{++}$ so that the atomic ratio of Fe$^{++}$/Fe$^{+++}$ became nearly 0.03.

The resulting magnetic powders were designated as comparative sample 9 and sample 11. Their characteristic properties as shown in Table 5.

TABLE 5

| Sample | Comparative Sample | Print-through (dB) |
|---|---|---|
| 8 | | 59.3 |
| | 6 | 54.0 |
| 9 | | 55.5 |
| | 7 | 51.2 |
| 10 | | 55.5 |
| | 8 | 51.3 |
| 11 | | 57.3 |
| | 9 | 53.8 |

As Table 5 shows, the print-through property of the magnetic material is improved when cobalt modification is carried out after $\gamma$-Fe$_2$O$_3$ has undergone heat treatment. This holds true regardless of the method of cobalt modification.

EXAMPLE 12

The same $\gamma$-Fe$_2$O$_3$ as used in Example 1 was heated at 550° C. for 4 hours and then underwent the same heat treatment as employed for cobalt modification of sample 1-4.

300 g of the heat-treated $\gamma$-Fe$_2$O$_3$ was dispersed in 2 liters of water. To the dispersion were added 31.6 g of cobalt sulfate (CoSO$_4$.7H$_2$O) and 31.3 g of ferrous sulfate (FeSO$_4$.7H$_2$O) dissolved in 0.5 liter of water, followed by vigorous stirring for 10 minutes by blowing nitrogen gas at a rate of 0.5 liter/min.

498 g of NaOH dissolved in 1 liter of water was added. The dispersion was heated, with stirring by blowing nitrogen gas. Reaction was carried out at 95° C. for 4 hours. The resulting magnetic material was designated as sample 12.

EXAMPLE 13

Example 12 was repeated except that the quantities of ferrous sulfate and sodium hydroxide were changed to 93.8 g and 516 g, respectively. The resulting magnetic material was designated as sample 13.

EXAMPLE 14

Example 12 was repeated except that the quantities of ferrous sulfate and sodium hydroxide were changed to 124.2 g and 525 g, respectively. The resulting magnetic material was designated as sample 14.

EXAMPLE 15

Sample 13 was moderately oxidized at 150° C. for 1 hour under a slow air stream in a retort. The resulting magnetic material was designated as sample 15.

COMPARATIVE EXAMPLES

Magnetic materials were prepared from comparative sample 1, which is $\gamma\text{-Fe}_2O_3$ which did not undergo heat treatment, according to the same method as used in Examples 12, 13, 14, and 15. The resulting magnetic materials were designated as comparative samples 10, 11, 12, and 13. Table 6 shows the characteristic properties of smples 1-4, 12, 13, 14, and 15, and comparative samples 1, 10, 11, 12, and 13.

It is noted as the $Fe^{++}/Fe^{+++}$ ratio is increased, the coercive force and $\sigma s$ are improved. However, the improvement of print-through which is achieved by preliminarily heating $\gamma\text{-Fe}_2O_3$ is decreased. FIG. 5 shows that the improvement of print-through is hardly made when the $Fe^{++}/Fe^{+++}$ ratio exceeds 0.10.

Comparative sample 1 was heated at 550° C. for 4 hours. The resulting magnetic material was designated as comparative sample 14. Its characteristic properties are shown in Table 6.

The heat-treatment for comparative sample 14 is the same as that used before cobalt modification of sample 1-4.

It is noted that the heat treatment slightly improves $\sigma s$, but aggravates Hc and print-through. A great improvement of squareness ratio (SQ) is noticed, but it is due to the improvement of crystal anisotropy achieved by the doping of cobalt ion, but not due to the improvement of orientation. This is apparent from the fact the SQ in the width direction is as great as 0.85.

TABLE 6

|  | Hc(Oe) | SQ | $\sigma s$ (emu/g) | $Fe^{++}/Fe^{+++}$ | Print-through (dB) |
|---|---|---|---|---|---|
| Sample |  |  |  |  |  |
| 1-4 | 641 | 0.83 | 71.0 | <0.01 | 58.2 |
| 12 | 624 | 0.81 | 73.5 | 0.032 | 55.0 |
| 13 | 657 | 0.79 | 76.8 | 0.088 | 47.6 |
| 14 | 671 | 0.76 | 78.7 | 0.124 | 43.5 |
| 15 | 630 | 0.82 | 75.0 | 0.052 | 51.6 |
| Comparative Samples |  |  |  |  |  |
| 1 | 670 | 0.80 | 68.5 | <0.01 | 53.1 |
| 10 | 652 | 0.80 | 70.9 | 0.031 | 50.4 |
| 11 | 679 | 0.78 | 74.0 | 0.089 | 46.2 |
| 12 | 691 | 0.75 | 76.0 | 0.125 | 43.6 |
| 13 | 661 | 0.78 | 71.0 | 0.045 | 50.2 |
| 14 | 635 | 0.86 | 69.8 | <0.01 | 51.1 |

Figure 6:
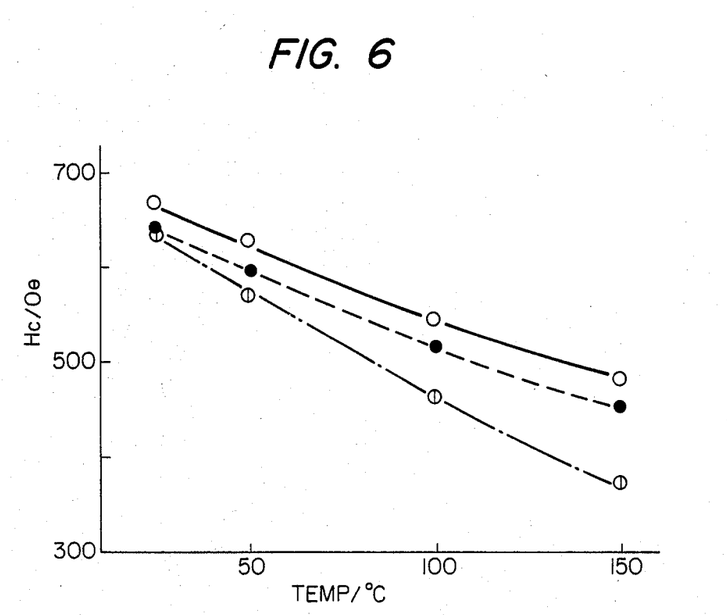
FIG. 6 is a graph showing the change of Hc with temperature. The broken line indicates the results in the case of this invention; the solid line indicates the results in the case where the heat treatment of this invention was not carried out; and the chain line indicates the results in the case where the heat treatment was carried out after cobalt modification.

FIG. 6 shows the relationship between the temperature and Hc of comparative samples 1 and 14 and sample 1-4. It is noted that where heat treatment is carried out after cobalt modification, Hc greatly varies depending on the temperature. This suggests that the heat treatment of this invention should be carried out before cobalt modification.

In FIG. 6 (Table 6), the solid line (comparative sample 1) indicates the results obtained by the conventional technology (no heat treatment), the broken line (sample 1-4) indicates the result obtained by cobalt modification after heat treatment, and the chain line (comparative sample 14) indicates the results obtained by heat treatment after cobalt modification. It is noted that where heat treatment is carried out after cobalt modification, Hc greatly varies depending on the temperature and the print-through property is rather deteriorated.

While the invention has been described in detail and with reference to specific embodiments thereof, it will be apparent to one skilled in the art that various changes and modifications can be made therein without departing from the spirit and scope thereof.

What is claimed is:

1. A process for preparing cobalt-modified ferromagnetic iron oxide by modifying ferromagnetic $\gamma\text{-Fe}_2O_3$ particles with cobalt wherein the modifying with cobalt is achieved by coating or growing a cobalt compound layer or a cobalt ferrite layer on the surface of the ferromagnetic $\gamma\text{-Fe}_2O_3$, wherein prior to cobalt modification treatment, the ferromagnetic $\gamma\text{-Fe}_2O_3$ is heat treated at a temperature in the range of from about $-200°$ C. to $+30°$ C. of the critical temperature at which critical temperature partial transition of $\gamma\text{-Fe}_2O_3$ into $\alpha\text{-Fe}_2O_3$ occurs and the saturation magnetization is reduced to 99% of the saturation magnetization measured before the heat treatment, and the atomic ratio of $Fe^{++}/Fe^{+++}$ after the cobalt modification is from 0.00 to 0.10, said cobalt-modified ferromagnetic iron oxide exhibiting a higher print through property than the cobalt-modified ferromagnetic iron oxide prepared as above absent the heat treatment of the $\gamma\text{-Fe}_2O_3$.

2. A process as claimed in claim 1, wherein the ferromagnetic $\gamma\text{-Fe}_2O_3$ is heat treated at a temperature in the range of from $-100°$ C. to $0°$ C. of the critical temperature treatment.

3. A process as claimed in claim 1, wherein the heating temperature is in the range of from $-50°$ C. to $0°$ C. of the critical temperature.

4. A process as claimed in claim 1, wherein the atomic ratio of $Fe^{++}/Fe^{+++}$ after cobalt modification is from 0.00 to 0.05.

5. A process as claimed in claim 1, wherein the atomic ratio of $Fe^{++}/Fe^{+++}$ after the cobalt modification is from 0.00 to 0.02.

* * * * *